United States Patent

Chinazzo

(10) Patent No.: US 10,098,189 B2
(45) Date of Patent: Oct. 9, 2018

(54) INDUCTION COOKING HOB

(71) Applicant: WHIRLPOOL CORPORATION, Benton Harbor, MI (US)

(72) Inventor: Fabiano Chinazzo, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 235 days.

(21) Appl. No.: 15/153,901

(22) Filed: May 13, 2016

(65) Prior Publication Data

US 2016/0338153 A1    Nov. 17, 2016

(30) Foreign Application Priority Data

May 14, 2015  (EP) ..................................... 15167775

(51) Int. Cl.
| | |
|---|---|
| *H05B 6/12* | (2006.01) |
| *H05B 6/44* | (2006.01) |
| *H05B 1/02* | (2006.01) |
| *H05B 6/36* | (2006.01) |

(52) U.S. Cl.
CPC ............. *H05B 6/44* (2013.01); *H05B 1/0266* (2013.01); *H05B 6/1254* (2013.01); *H05B 6/365* (2013.01); *H05B 2206/022* (2013.01); *Y02B 40/126* (2013.01)

(58) Field of Classification Search
CPC ............................................ H05B 6/12–6/129
See application file for complete search history.

(56) References Cited

U.S. PATENT DOCUMENTS

2016/0255682 A1*  9/2016  Fossati ................ H05B 6/1254
                                                                                29/606

FOREIGN PATENT DOCUMENTS

| CN | 201414236 Y | 2/2010 |
|---|---|---|
| EP | 1335632 A2 | 8/2003 |
| EP | 2312910 A1 | 4/2011 |
| EP | 2490505 A1 | 8/2012 |
| FR | 2659725 A1 | 9/1991 |
| JP | 2010262884 A | 11/2010 |
| WO | 2011138715 A1 | 11/2011 |

OTHER PUBLICATIONS

European Patent Office, European Search Report for European Application No. 15167775.4-1808, dated Nov. 16, 2015, 4 pages.

* cited by examiner

*Primary Examiner* — Michael Laflame, Jr.
(74) *Attorney, Agent, or Firm* — Price Heneveld LLP

(57) ABSTRACT

An induction cooking heater including an inductor having a number of magnetic field concentration bars located beneath the inductor. The inductor having the magnetic field concentration bars is supported by a polymeric frame. The polymeric frame includes a first support element on which the inductor is wound and a second support element that supports the magnetic field concentration bars. The first support element and the second support element are assembled together through a central ring-shaped zone having a snap engagement. The inductor is wound on an upper surface of the first support element opposite to the second support element.

17 Claims, 4 Drawing Sheets

INDUCTION COOKING HOB

CROSS-REFERENCE TO RELATED APPLICAITON

This application claims priority to European Patent Application No. EP 15167775.4, filed May 14, 2015, entitled "INDUCTION COOKING HOB," the disclosure of which is incorporated herein by reference in its entirety.

FIELD OF DISCLOSURE

The present disclosure relates to an induction cooking heater of the type comprising at least one inductor and magnetic field concentration bars located beneath the inductor, the inductor and the magnetic concentration bars being placed on a polymeric frame, such frame comprising a first support element on which the inductor is wound and a second support element which supports said magnetic field concentration bars, both said elements being assembled together.

BACKGROUND

It is well known in the art of induction cooking appliances that inductors, i.e. induction coils, present a strong part to part variation especially in a not entirely automatic process of manufacturing these components (i.e. a process entirely carried out by robots or the like), particularly when the coil pancake elements are joined together using a glue which is also used to fix not only inductor and ferrites, but also mineral wool, mica and aluminum tray.

This aspect significantly influences the cooktop performances and the design development, and therefore the production process strongly affects the inductor quality. For the above reasons many appliance producers now use a plastic frame structure that increases the uniformity of products because it fixes the routing of the coil winding turns and the relative position between ferrites and wire.

A great number of producers adopt a solution in which induction coils are mounted on a plastic frame which is used for the coil winding on one side and for placing the ferrite bars on the other side. There are also solutions with a plastic frame is used only for ferrite bars while the winding is placed over with glue or bi-adhesive stripes.

The above known solutions have the disadvantage of making the production process quite complex and difficult to carry out in a totally automatic way. Moreover, the different temperatures reached by the magnetic field concentration bars and coil lead the designer to choose a polymeric material which can withstand the highest temperatures and therefore the polymeric support needs to be made of a quite expensive polymer which can withstand such high temperatures.

The technical solution of the induction cooking heater disclosed by CN201414236 has the disadvantage of increasing the distance between the windings of the inductor and the ceramic glass where a cooking utensil is placed. This is due to the thickness of the first plastic frame which is interposed between the windings and the glass of the cooking appliance. Such an increased distance decreases the energy efficiency of the inductor. Moreover, since the windings of the inductor on the first plastic frame is usually performed so that the wire is placed on the frame from above, it is necessary to flip over the upper frame during the assembly process of the two frames, and this leads to a complication of the assembly line.

Another disadvantage of the above known solution derives from the almost identical diameters of the two plastic elements which are connected on their peripheral edge, since this requires a large amount of polymeric material.

It is an object of the present disclosure to provide an induction cooking heater which does not present the problems detailed above.

BRIEF SUMMARY

According to one aspect of the present disclosure, an induction cooking heater is provided. The induction cooking heater includes an inductor having a number of magnetic field concentration bars located beneath the inductor. The inductor having the magnetic field concentration bars is supported by a polymeric frame. The polymeric frame includes a first support element on which the inductor is wound and a second support element that supports the magnetic field concentration bars. The first support element and the second support element are assembled together through a central ring-shaped zone having a snap engagement. The inductor is wound on an upper surface of the first support element opposite to the second support element.

According to another aspect of the present disclosure, an induction cooking heater is provided. The induction cooking heater includes an inductor having a number of magnetic field concentration bars located beneath the inductor. The inductor having the magnetic field concentration bars is supported by a polymeric frame. The polymeric frame includes a first support element on which the inductor is wound and a second support element that supports the magnetic field concentration bars. The first support element and the second support element are assembled together through an annular zone having a snap engagement. The inductor is wound on an upper surface of the first support element opposite to the second support element. The first element presents a plurality of arms stemming out from a central zone that are joined at an intermediate ring.

According to yet another aspect of the present disclosure, a method for producing an induction cooking heater is provided. The method for producing the induction cooking heater includes at least one inductor and a group of magnetic field concentration bars located beneath the inductor, the inductor and the group of magnetic field concentrations bars are supported by a polymeric frame. The method for producing the induction cooking heater further includes winding a wire on an upper surface of a first support element opposite to the field concentration bars, inserting said magnetic field concentration bars on a second support element, and assembling together the first support element and the second support element.

These and other features, advantages, and objects of the present device will be further understood and appreciated by those skilled in the art upon studying the following specification, claims, and appended drawings.

BRIEF DESCRIPTION OF THE DRAWINGS

Further details and advantages of the present disclosure will become clear from the following detailed description, with reference to the attached drawings, in which:

FIGS. 13-14 are similar to FIGS. 11-12 and show the lower support element of

FIGS. 6 and 7 with ferrites mounted thereon; and

DETAILED DESCRIPTION OF EMBODIMENTS

Figure 1:
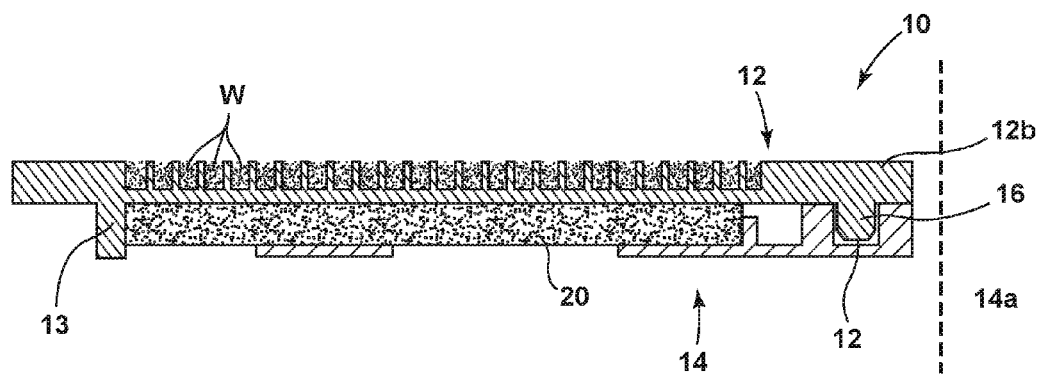
FIG. 1 is a partial cross section view of an induction cooking heater according to a first embodiment of the present disclosure where some ancillary components (connection wires, insulation layers etc.) have been omitted for sake of clarity.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

According to the disclosure, the double frame is created with two joined elements, a first or upper support element 12 and a second or lower support element 14. The upper support element 12 for coil winding and the lower support element 14 for the ferrite bars, does not increase the distance of the coil windings from the ceramic glass, therefore increasing the efficiency of the inductor.

According to a preferred feature of the disclosure, the second support element 14 of the frame presents a dimension sensibly lower than the dimension of the first support element 12, therefore allowing a reduction of the amount of polymer material needed for the plastic frame. Preferably the first and second elements are made of different polymeric materials, and they are preferably assembled by means of snap engagement portions placed in the inner zone of said elements and/or in an intermediate zone comprised between the center ring-shaped zone and the peripheral edge or outside peripheral ring.

According to the claimed features of the disclosure it is possible to obtain an energy efficient, flexible and a cheaper solution compared to prior art that can be produced with a high efficiency line automation process characterized by an high productivity.

Figure 2:
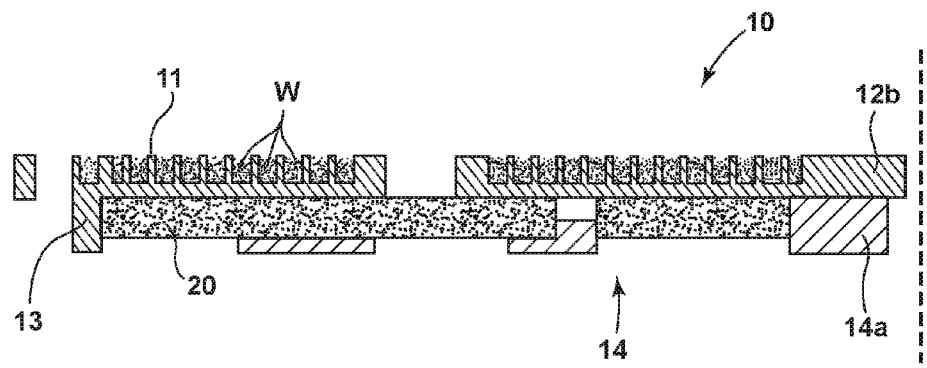
FIG. 2 is similar to FIG. 1 and relates to a second embodiment of the disclosure.

With reference to the drawings and particularly to FIG. 1, an induction cooking heater 10 comprises an upper plastic support element 12 comprising a plurality of radial arms 12a stemming out from a second central ring-shaped zone 12b (only half of this central zone is shown in FIGS. 1 and 2).

On an upper surface 11 of the upper support element 12 provided with a plurality of grooves G, a wire W is wound. Below the upper support element 12, a lower plastic support element 14 is placed, which in the embodiments shown in FIGS. 3, 5, 6 and 7 presents a first central ring-shaped zone 14a.

The assembly between the upper support element 12 and the lower support element 14 is carried out in their respective central zones where pins 16 provided in the upper elements 12 cooperate with corresponding central seats 18 provided in the lower elements 14. This solution allows for a greater number of wound wires in the central area of the inductor thus increasing the probability to detect a pot with a lower bottom dimension. Snap engagement means (not shown) assure a quick and stable connection between the two elements, even if a manual disassembly thereof is not prevented. The number of pins 16 (four in the shown example) and of the corresponding matching central seats 18 assure a correct positioning of the upper and lower support elements 12 and 14.

Figure 3:
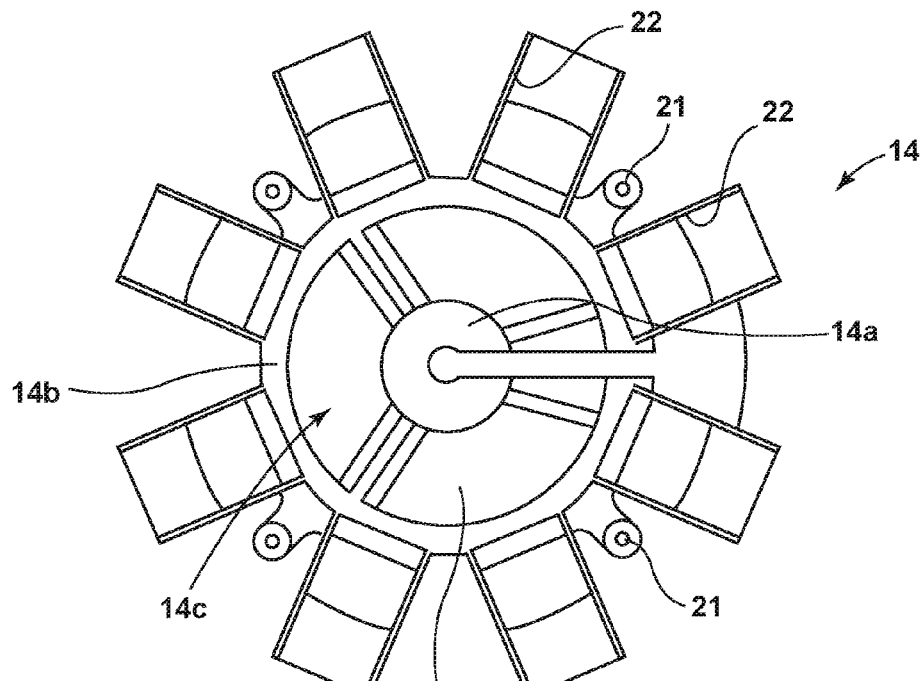
FIG. 3 is a top view of the lower plastic support element used in the induction cooking heater of FIG. 2.

According to FIG. 3, an embodiment is shown in which the coupling of the upper support element 12 and the lower support element 14 is carried out by protruding pins 21 in the lower support element 14 which are matching corresponding seats 27 of the upper support element 12 provided in an annular intermediate ring 15 thereof. Of course the fastening or coupling solutions of the above two embodiments can be combined together as well.

Magnetic field concentration bars 20 or ferrite bars 20 are entrapped between the first support element 12 and second support element 14, and therefore glue or bi-adhesive are no longer necessary (with a decrease of overall cost). In order to assure a fixed position of the ferrite bars 20, the lower support element 14 presents preferably seats 22 (shown in FIG. 3 as radial tile-shaped portions stemming out from an annular portion 14b placed at a predetermined radial distance from the ring-shaped) whose dimensions match the dimensions and shape of the ferrite bars 20. Between the first central ring-shaped zone 14a and the annular portion 14b an intermediate zone 14c is defined with shaped seats S for additional ferrites.

According to the solution shown in FIG. 5, the lower support element 14 does not need to have a lower wall, rather it can have only a side wall 24 for centering the ferrite bars 20 on an auxiliary support plate placed below the inductor (not shown).

Figures 5, 6, 7:
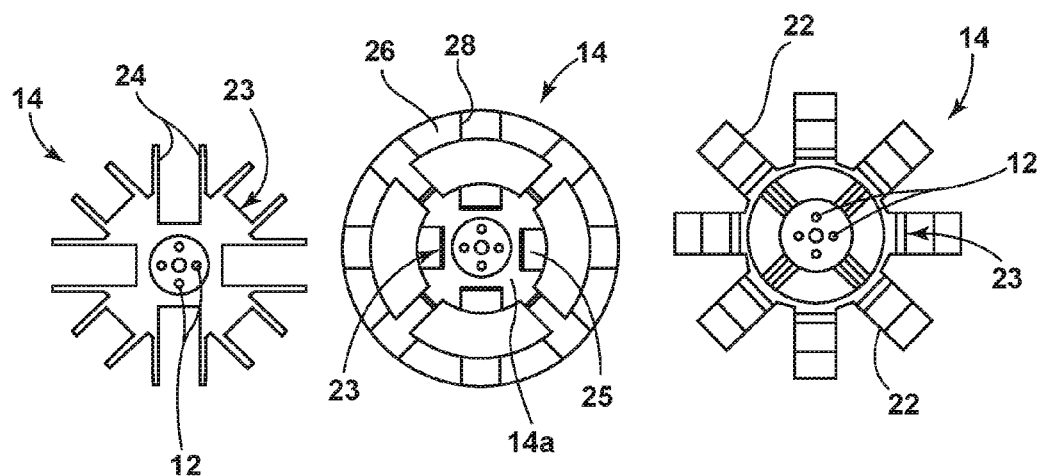
FIGS. 5-7 are different versions of the lower plastic support element which can be combined with upper elements.
Figure 4:
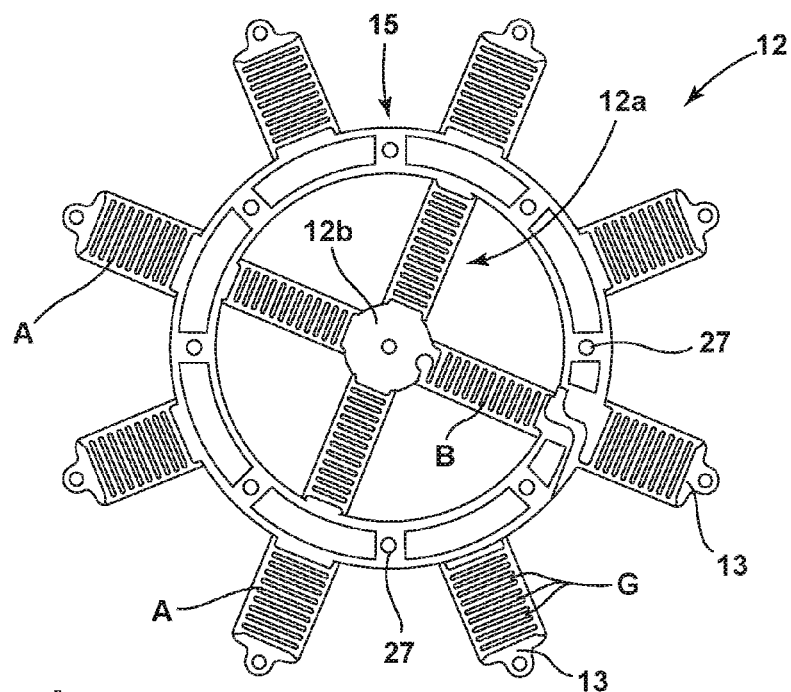
FIG. 4 is a top view of the upper plastic support element used in combination with the lower plastic support element of FIG. 3.

Moreover, the shape of the lower support element can vary from the ones shown in FIGS. 3 and 5 and it can have several arms (FIG. 6) stemming from the first central ring-shaped zone 14a and connected to an outside peripheral ring 26. In such embodiment the first central ring-shaped zone 14a presents a radial lowered area 25 which is radially aligned with corresponding lowered zones 28 in said peripheral ring 26 for containing ferrite bars 20.

Figures 11, 12:
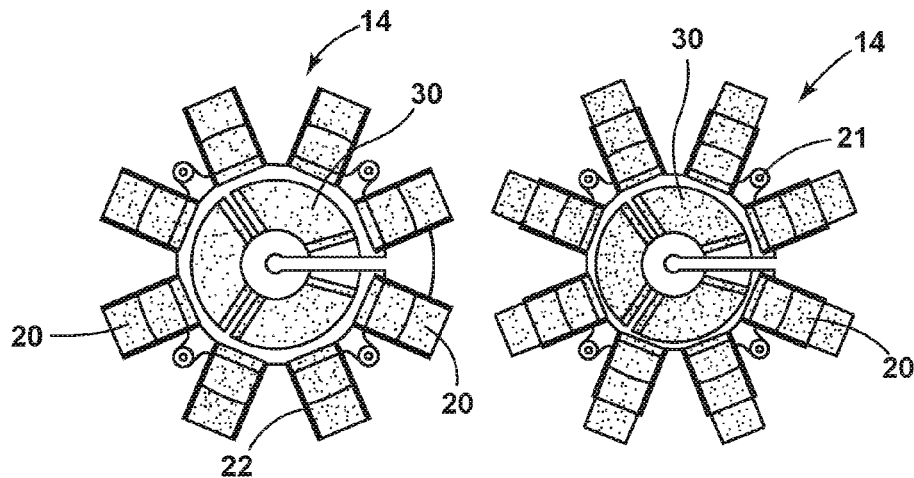
FIGS. 11-12 are top views of the lower support element of FIG. 3 with ferrite bars of different lengths mounted thereon.
Figures 13, 14:
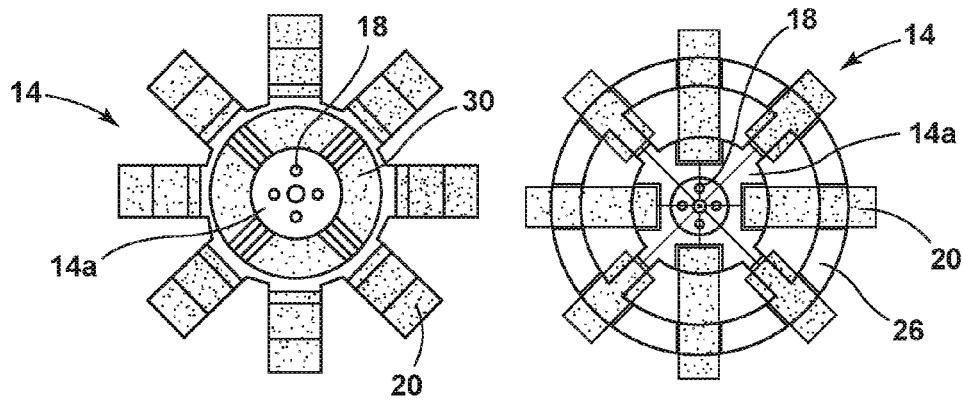

The seats in the lower support element 14, for each type of lower support element 14 shown in FIG. 3, 5, 6 or 7 present a radial end 23 near to the first central ring-shaped zone 14a of the lower support element 14 while the other side is open so as to allow the insertion of ferrite bars 20 which extend over and exceed the axial dimension of the seats 22, as clearly shown in FIGS. 12 and 14. For avoiding an accidental sliding of the ferrite bars 20, the upper support element 12 presents, for each of its arm 12a, a L shaped portion 13 (FIGS. 1 and 2) which acts as a radial stop for the ferrite bars 20. It is important to notice that the dimensions of the lower support element 14 can be reduced at minimum because the larger extension is done only by the ferrite length (FIGS. 12 and 14). So for each coil size and for each group, a ferrite placed in the plastic frame support 14 can be joined with a greater coil winding to the upper support element 12 that corresponds to the coil's nominal size. The first central ring-shaped zone 14a of the lower support element 14 may be also used for inserting auxiliary ferrites 30 having a circular shape, particularly a circular sector shape (FIGS. 11-13). Such solution has the advantage of higher standardization (the internal ferrites structure of a coil can be equal for all the coil round shape dimensions because the inductor size can be obtained using different lengths of the ferrite bars 20), thermal efficiency (the winding internal section of a coil is the hottest part and a larger ferrite layer under this zone permits to reduce temperatures), and higher cooking performances (the presence of the ferrites in a zone nearer to the coil center permits to reach a better heating uniformity on the pot bottom and a lower influence on the temperature sensor of the winding magnetic flux lines).

Figures 8, 9, 10:
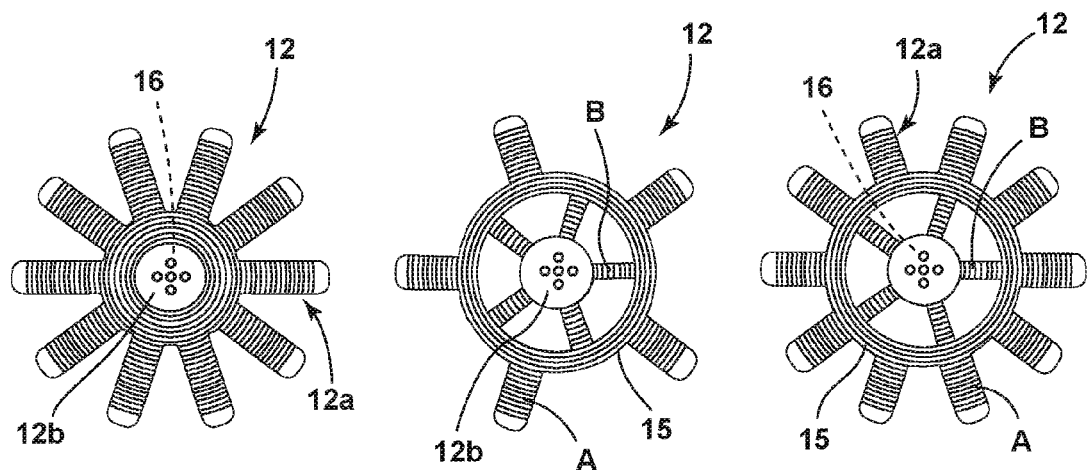
FIGS. 8-10 are different versions of the upper element which can be combined with any of the lower elements of FIGS. 5-7.

In a way similar to the lower support element 14, the upper support element 12 can also have different shapes and three additional variants are shown in FIGS. 8-10. Of course the shape will be chosen also in relation to the numbers and dimensions of the coil wires, allowing the designer to easily combine different elements in order to obtain the best result either in terms of mechanical strength and confinement of the magnetic field.

Figures 15, 16:
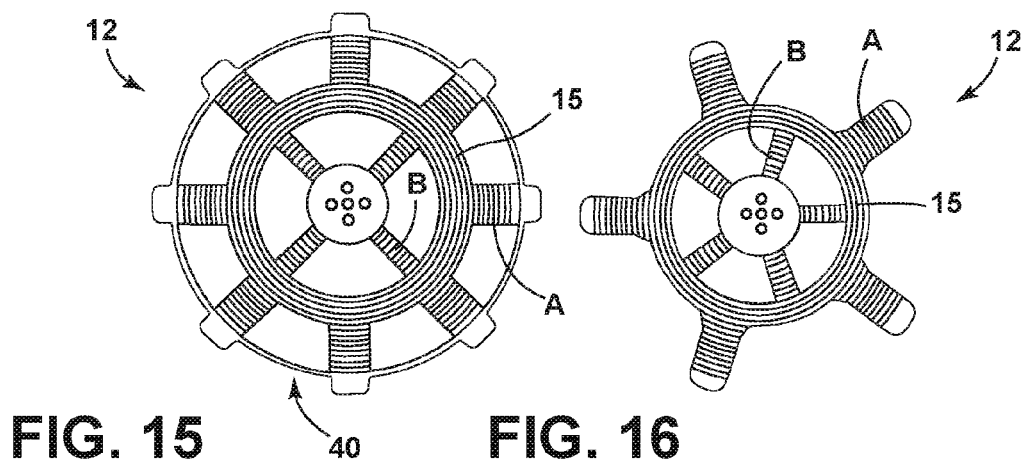
FIGS. 15-16 are top views of further embodiments of the upper plastic support element designed to increase mechanical robustness of the inductor plastic frame.

According to another embodiment (FIG. 15), the arms 12a of the upper support elements 12 present an outer reinforcing ring 40. In the embodiment of FIGS. 9 and 16, the number of arms 12a outside the intermediate ring 15 and referred to in the drawings with reference A, is identical to the number of arms 12a inside the ring 15, identified in the drawings with reference B, but with an angular offset. In FIG. 6 such arms A and B are in a radial distribution with reference to the intermediate ring 15. In the embodiment of FIG. 10, the number of outside arms A is double the number of inner arms B. The Applicant has discovered that both solutions according to FIGS. 9, 16, and/or 10 present a very low warping after injection moulding process, and this result is obtained with a very low amount of polymer used for the frame.

The snap joint solution permits having at the same time a winding structure with the desired number of arms (useful to improve mechanical robustness of the support) and a suitable ferrite quantity in view of the central and/or intermediate joint between such elements. In particular a winding plastic frame can be joined with a different arm number ferrite plastic support using the external ring 40 in order to avoid the accidental sliding of the ferrite bars.

According to another preferred feature of the disclosure, an overall cost saving is possible by using different plastic materials for the two support elements on the basis of the maximum temperatures reached. Usually the ferrite bars 20 arrive at temperatures (around 140° C.) that are lower if compared with the temperatures of the windings (200° C.-220° C.). Therefore for the lower support element 14 a lower performance polymeric compound can be used, for instance a thermoplastic polymer chosen from polyamides (nylon 6,6), polyolefins, polystyrene and related polymers, polyvinlylchloride and related polymers and saturated polyesters. For the upper support element 12 a heat resistant polymer is preferred, for instance polyphenylene sulfide (PPS) reinforced with glass fibers. Of course other engineering polymer can be used.

Another substantial advantage of the induction cooking heater according to the present disclosure relates to the induction coil automation line process improvement. The number of line steps can be reduced compared to known solutions since the plastic support flip over phase is no longer necessary. The main result is that coil wire wrapping and ferrites insertion steps can be done in parallel, reducing in this way the piece cycle time. So, by increasing the pieces number per hour, the line automation efficiency is greater and consequently the investment payback time is lower.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

Listing of Non-Limiting Embodiments

Embodiment A is an induction cooking heater comprising an inductor having a number of magnetic field concentration bars located beneath the inductor wherein the inductor having the magnetic field concentration bars is supported by a polymeric frame, wherein the polymeric frame comprises a first support element on which the inductor is wound and a second support element that supports the magnetic field concentration bars, wherein the first support element and the second support element are assembled together through a central ring-shaped zone having a snap engagement, wherein the inductor is wound on an upper surface of the first support element opposite to the second support element.

The device of Embodiment A wherein the dimension of the second support element is lower than the dimension of the first support element.

The device of Embodiment A or Embodiment A with one or more of the intervening features wherein the second support element presents a plurality of seats for the magnetic field concentration bars, each seat having a radial end far from the central zone open so that the seat may contain the magnetic field concentration bars which are longer than the seats.

The device of Embodiment A or Embodiment A with one or more of the intervening features wherein an intermediate zone of the second support element presents a seat for a group of curved field concentration bars.

The device of Embodiment A or Embodiment A with one or more of the intervening features wherein the group of curved field concentration bars present a plurality of flat ferrite elements having a circular sector shape.

The device of Embodiment A or Embodiment A with one or more of the intervening features wherein the first element presents a plurality of arms stemming out from a central zone that are joined at an intermediate ring.

The device of Embodiment A of Embodiment A with one or more of the intervening features wherein the intermediate ring divides the first support element into two zones, a central zone with a number of first radial arms and a second zone with a number of cantilevered second radial arms.

The device of Embodiment A or Embodiment A with one or more of the intervening features wherein the number of first arms are identical to the number of second arms and the first arms and the second arms are angularly shifted relative to each other.

The device of Embodiment A or Embodiment A with one or more of the intervening features wherein the number of first arms is lower than the number of the second arms.

The device of Embodiment A or Embodiment A with one or more of the intervening features wherein the first support element comprises a first polymeric material and the second support element comprises a different second polymeric material.

Embodiment B is an induction cooking heater comprising an inductor having a number of magnetic field concentration bars located beneath the inductor wherein the inductor having the magnetic field concentration bars is supported by a polymeric frame, wherein the polymeric frame comprises a first support element on which the inductor is wound and a second support element that supports the magnetic field concentration bars, wherein the first support element and the second support element are assembled together through an annular zone having a snap engagement, wherein the inductor is wound on an upper surface of the first support element opposite to the second support element, wherein the first element presents a plurality of arms stemming out from a central zone that are joined at an intermediate ring.

The device of Embodiment B wherein the second support element presents a plurality of seats for the magnetic field concentration bars, each seat having a radial end far from the central zone open so that the seat may contain the magnetic field concentration bars which are longer than the seats.

The device of Embodiment B or Embodiment B with one or more of the intervening features wherein an intermediate zone of the second support element presents a seat for a group of curved field concentration bars.

The device of Embodiment B or Embodiment B with one or more of the intervening features wherein the group of curved field concentration bars present a plurality of flat ferrite elements having a circular sector shape.

The device of Embodiment B or Embodiment B with one or more of the intervening features wherein the intermediate ring divides the first support element into two zones, a central zone with a number of first radial arms and a second zone with a number of cantilevered second radial arms.

The device of Embodiment B or Embodiment B with one or more of the intervening features wherein the number of first arms are identical to the number of second arms and the first arms and the second arms are angularly shifted relative to each other.

The device of Embodiment B or Embodiment B with one or more of the intervening features wherein the dimension of the second support element is lower than the dimension of the first support element.

Embodiment C is a method for producing an induction cooking heater comprising at least one inductor and a group of magnetic field concentration bars located beneath the inductor, the inductor and the group of magnetic field concentration bars are supported by a polymeric frame comprising: winding a wire on an upper surface of a first support element opposite to the field concentration bars; inserting said magnetic field concentration bars on a second support element; and assembling together the first support element and the second support element.

The method of Embodiment C wherein the first support element and the second support element are assembled by a snap-engagement in a central zone thereof.

The method of Embodiment C or Embodiment C with one or more of the intervening features wherein the first element presents a plurality of arms stemming out from a central zone that are joined at an intermediate ring and the intermediate ring divides the first support element into two zones, a central zone with a number of first radial arms and a second zone with a number of cantilevered second radial arms.

What is claimed is:

1. An induction cooking heater comprising an inductor having a number of magnetic field concentration bars located beneath the inductor wherein the inductor having the number of magnetic field concentration bars is supported by a polymeric frame, wherein the polymeric frame comprises a first support element on which the inductor is wound and a second support element that supports the number of magnetic field concentration bars, wherein the first support element and the second support element are assembled together through a central ring-shaped zone having a snap engagement, wherein the inductor is wound on an upper surface of the first support element opposite to the second support element.

2. The induction cooking heater according to claim 1, wherein a dimension of the second support element is lower than the dimension of the first support element.

3. The induction cooking heater according to claim 2, wherein the second support element presents a plurality of seats for the number of magnetic field concentration bars, each seat having a radial end far from the central zone open so that the seat may contain the number of magnetic field concentration bars which are longer than the plurality of seats.

4. The induction cooking heater according to claim 1, wherein an intermediate zone of the second support element comprises a seat for a group of curved field concentration bars.

5. The induction cooking heater according to claim 4, wherein the group of curved field concentration bars comprise a plurality of flat ferrite elements having a circular sector shape.

6. The induction cooking heater according to claim 1, wherein the first element comprises a plurality of arms stemming out from a central zone that are joined at an intermediate ring.

7. The induction cooking heater according to claim 6, wherein the intermediate ring divides the first support element into two zones, a central zone with a number of first radial arms and a second zone with a number of cantilevered second radial arms.

8. The induction cooking heater according to claim 7, wherein the number of first arms are identical to the number of second arms and the first arms and the second arms are angularly shifted relative to each other.

9. The induction cooking heater according to claim 7, wherein the number of first arms is lower than the number of the second arms.

10. The induction cooking heater according to claim 1, wherein the first support element comprises a first polymeric material and the second support element comprises a different second polymeric material.

11. An induction cooking heater comprising an inductor having a number of magnetic field concentration bars located beneath the inductor wherein the inductor having the number of magnetic field concentration bars is supported by a polymeric frame, wherein the polymeric frame comprises a first support element on which the inductor is wound and a second support element that supports the number of magnetic field concentration bars, wherein the first support element and the second support element are assembled together through an annular zone having a snap engagement, wherein the inductor is wound on an upper surface of the first support element opposite to the second support element, wherein the first element presents a plurality of arms stemming out from a central zone that are joined at an intermediate ring.

12. The induction cooking heater according to claim 11, wherein the second support element presents a plurality of seats for the number of magnetic field concentration bars, each seat having a radial end far from the central zone open so that the seat may contain the number of magnetic field concentration bars which are longer than the plurality of seats.

13. The induction cooking heater according to claim 11, wherein an intermediate zone of the second support element comprises a seat for a group of curved field concentration bars.

14. The induction cooking heater according to claim 13, wherein the group of curved field concentration bars comprise a plurality of flat ferrite elements having a circular sector shape.

15. The induction cooking heater according to claim 14, wherein the intermediate ring divides the first support element into two zones, a central zone with a number of first radial arms and a second zone with a number of cantilevered second radial arms.

16. The induction cooking heater according to claim 15, wherein the number of first arms are identical to the number of second arms and the first arms and the second arms are angularly shifted relative to each other.

17. The induction cooking heater according to claim 11, wherein a dimension of the second support element is lower than the dimension of the first support element.

* * * * *